United States Patent [19]

Russell et al.

[11] 3,932,361

[45] Jan. 13, 1976

[54] CATALYSTS FOR THE REACTION OF CYCLIC NITRILE COMPOUNDS WITH NUCLEOPHILIC COMPOUNDS

[75] Inventors: Donald H. Russell, Cherry Hill, N.J.; R. Warren Lenton, Glenolden, Pa.

[73] Assignee: Atlantic Richfield Company, Los Angeles, Calif.

[22] Filed: Nov. 21, 1974

[21] Appl. No.: 525,701

Related U.S. Application Data

[63] Continuation-in-part of Ser. No. 442,274, Feb. 13, 1974, abandoned.

[52] U.S. Cl. .................. 260/77.5 B; 260/75 NB; 260/77.5 AB; 260/77.5 C
[51] Int. Cl.² ........................................ C08G 18/00
[58] Field of Search.... 260/2.5 AB, 75NB, 77.5 AB, 260/77.5 C, 2.5 AT, 75 NT, 77.5 AT, 77.5 TB

[56] References Cited
UNITED STATES PATENTS

| | | | |
|---|---|---|---|
| 3,119,792 | 1/1964 | Schulthers et al. | 260/77.5 AB |
| 3,409,461 | 11/1968 | Mehlo et al. | 117/100 |
| 3,480,595 | 11/1969 | Burk et al. | 260/2.5 AT |
| 3,583,945 | 6/1971 | Robins | 260/2.5 AB |
| 3,652,507 | 3/1972 | Burk et al. | 260/77.5 C |
| 3,658,805 | 4/1972 | Burk et al. | 260/77.5 AT |
| 3,659,003 | 4/1972 | Johnson et al. | 260/859 |
| 3,676,405 | 7/1972 | Labana | 260/77.5 CR |
| 3,694,389 | 9/1972 | Levy | 260/77.5 TB |
| 3,702,320 | 11/1972 | Fritok et al. | 260/2.5 AB |
| 3,703,499 | 11/1972 | Lindemann | 260/77.5 AT |
| 3,844,862 | 10/1974 | Sauer et al. | 260/77.5 AT |

*Primary Examiner*—H. S. Cockeram
*Attorney, Agent, or Firm*—Coleman R. Reap

[57] ABSTRACT

Storage stable urethane-type polymer producing compositions in dry powdered form are presented comprised of a cyclic nitrile compound of the formula

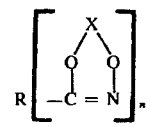

wherein X is carbonyl, thionyl or oxalyl, R is an organic radical which is free of reactive hydrogen atoms, and n is 2 or more, such as adipodi(nitrile carbonate), a nucleophilic compound containing a reactive hydrogen atom, such as a polyester or polyether polyol and a catalyst comprised of a halide of a metal of Group IIb of the Periodic Table of Elements. The preferred catalysts are zinc chloride and zinc bromide.

14 Claims, No Drawings

CATALYSTS FOR THE REACTION OF CYCLIC NITRILE COMPOUNDS WITH NUCLEOPHILIC COMPOUNDS

RELATED CASE

This is a continuation-in-part application of U.S. application Ser. No. 442,274, filed Feb. 13, 1974, now abandoned. Copending U.S. patent application Ser. No. 442,275, filed on Feb. 13, 1974, by D. H. Russell and R. W. Lenton discloses and claims the preparation of oxazolidone-containing polymeric compounds by the reaction of cyclic nitrile compounds with epoxides and optionally nucleophilic compounds in the presence of a halide of a metal of Groups IIb, IIIa, IV or VIII of the Periodic Table.

BACKGROUND OF THE INVENTION

The present invention relates to improved urethane-type polymer producing compositions. More particularly, the present invention relates to improved storage stable polymer-producing compositions comprised of one or more compounds having reactive hydrogen atoms, one or more cyclic nitrile compounds and a catalyst comprising a halide of a metal from Group IIb of the Periodic Table.

In the past, it has been common practice to prepare ureas, urethanes, and thiourethanes by the reaction of an isocyanate and an active hydrogen-containing material. Although the use of isocyanates for the preparation of ureas, urethanes, and thiourethanes is quite popular and extensively employed, there are a number of problems with this reaction. First, the isocyanates are unstable and present storage and handling difficulties. Secondly, many isocyanates, particularly the aliphatic isocyanates, are highly toxic. Thirdly, the reactivity of the —NCO group precludes premixing of the isocyanate with the reactive hydrogen-containing material to form a single component system without first blocking the terminal isocyanate groups. However, curing the blocked isocyanate materials to liberate the blocking group and to reactivate the —NCO group requires high curing temperatures. Finally, in the production of foamed polyurethanes, polythiourethanes, and polyureas, via the isocyanate route, it is necessary to go through the expense and inconvenience of adding a separate foaming agent or of using an excess of isocyanate and water to obtain the required gas release.

The disadvantages mentioned above are not, however, present in a process for preparing polymeric organic compounds by condensation of a compound containing a reactive hydrogen with a compound having the structural formula:

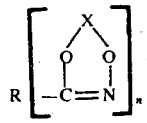

wherein X is carbonyl, thionyl or oxalyl, R is an organic radical free of reactive hydrogen atoms, and $n$ is 2 or more.

There are several known techniques for carrying out the reaction of an active hydrogen-containing material with cyclic nitrile compounds in the presence of catalysts. For example, in U.S. Pat. No. 3,531,425 a process is described in which the reaction is carried out in the presence of a strong base such as tertiary amines, having a pKa above 8. In U.S. Pat. No. 3,652,507 the reaction is carried out in the presence of soluble catalysts containing a first metal from Groups III through V of the Periodic System and a second metal from Groups I, II or the iron series of Group VIII of the Periodic System. It was found in accordance with U.S. Pat. No. 3,625,507 that in most cases strongly basic materials (alkali metal alkoxides, tertiary amines, etc.) must be utilized in conjunction with the catalysts in order to obtain reaction rates which are acceptable for foam formulation. In U.S. Pat. No. 3,702,320 it is disclosed that the reaction may be carried out in the presence of a soluble compound of aluminum, tin, titanium, zinc, bismuth or iron at a temperature of about 120°C to 150°C, provided that when the metal is aluminum, tin, titanium, or bismuth no metal of Group I, II or the iron series of Group VIII is present and when the metal is zinc or iron, the reaction is conducted in the absence of metals of Groups III through V.

Copending U.S. patent application Ser. No. 427,153, filed on Dec. 21, 1973 in the name of L. G. Wolgemuth discloses that the reactions may be carried out in the presence of an alkali metal salt of an organic acid and a metal ion of Groups III through V of the Periodic Table.

The catalyst systems described in U.S. Pat. No. 3,652,507 are effective in catalyzing the condensation-rearrangement reaction but they have disadvantages which detract from their desirability. First, they are difficult to prepare and their preparation involves several chemical steps including a purification step. Secondly, they have relatively poor storage stability and, therefore, should be freshly prepared for greatest effectiveness. Thirdly, polymer prepared using the described catalyst systems often undergoes thermal degradation upon further processing. Urethane-type polymer producing compositions made from the above described catalytic systems having relatively poor shelf life. Because of the need for storage stable urethane-type polymer producing systems new and improved catalyst systems and compositions are continuously sought.

It is, therefore, an object of the present invention to present storage stable compositions which react upon heating to produce compounds having two or more urea, urethane or thiourethane groups comprised of a cyclic nitrile compound, and an organic compound having active hydrogens. Another object of the present invention is to present improved polyurethane-type polymer producing compositions in dry powdered form which can be reacted to produce compounds having two or more urea, urethane or thiourethane groups comprised of cyclic nitrile compounds, organic compounds having active hydrogen atoms and an anhydrous catalyst. It is another object of the invention of present improved urethane-type polymer producing compositions which react to produce polymers having improved thermal stability.

These and other objects and advantages of the present invention will be apparent from the following detailed description.

SUMMARY OF THE INVENTION

Storage stable compositions in dry powdered form are presented comprised of at least one cyclic nitrile compound of the formula:

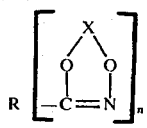

wherein X is carbonyl, thionyl or oxalyl, R is an organic radical free of nucleophilic groups as determined by the Zerewitinoff test, and n is 2 or more; at least one nucleophilic organic compound having at least two reactive hydrogen atom as determined by the Zerewitinoff test and a catalytically effective amount of an anhydrous catalyst comprised of a halide of a metal of Group IIb of the Periodic Table. The compositions of the invention are stable at ordinary storage and handling temperatures but will easily react when heated to a temperature of about 120°C to about 300°C. The preferred catalyst is zinc chloride.

DESCRIPTION OF THE INVENTION

DEFINITIONS

The term cyclic nitrile compound is used to describe compounds containing

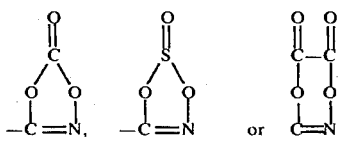

groups.

The term urethane-type polymers is used herein to describe the polymeric compounds obtained when a cyclic nitrile compound reacts with a nucleophilic compound to produce a polyurethane, polyurea, polythiourea or mixtures of any or all of these.

The term organic nucleophilic group is used herein to describe organic compounds having active hydrogen atoms as determined by the Zerewitinoff test.

The term storage-stable when applied to a composition means that the composition can be stored for several months at ordinary storage temperatures without undergoing substantial deterioration or chemical change. A storage period of about four months at temperatures of up to about 50°C is considered to be a satisfactory minimum storage period under this definition.

In accordance with the invention, one or more of the nucleophilic compounds may be combined with one or more cyclic nitrile compounds and a catalyst to provide a variety of urethane-type polymer-producing compounds.

THE CYCLIC NITRILE COMPOUNDS

The cyclic nitrile compounds used in the invention have the structure

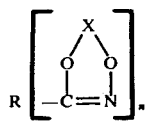

wherein X is carbonyl,

thionyl,

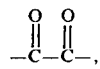

or oxalyl, $$-\overset{O}{\underset{\|}{C}}-\overset{O}{\underset{\|}{C}}-,$$

n is at least 2 and R is an organic radical having from 2 to about 200,000 carbon atoms and is free of reactive hydrogens as determined by the Zerewitinoff test. A compound which contains a reactive hydrogen as determined by the Zerewitinoff test is one which, when contacted with a Grignard solution of methyl iodide, will effect the liberation of methane by decomposition of the Grignard reagent. Frequently R will consist essentially of carbon and hydrogen atoms and by "consisting essentially of carbon and hydrogen" is meant that the essential composition of the radical is carbon and hydrogen but that there can be included therein other elements as well, so long as they do not materially effect the radical's basic characteristic of being non-interfering in the condensation reaction of the cyclic nitrile group with the reactive hydrogen group. Examples of non-interfering groups which can be present in R and which contain elements other than carbon and hydrogen are alkoxy, nitro, and halo groups. The R radical can be aromatic, e.g., of 1 to 3 aromatic rings (fused or non-fused) or non-aromatic and when the latter, can be cyclic or acyclic and saturated or ethylenically or acetylenically unsaturated. Acyclic R's can be straight or branched chain. The cyclic nitrile carbonate group can be attached to an aromatic ring carbon atom, to a cycloaliphatic ring carbon or to a non-ring carbon atom.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention may vary from 2 to as high as 100,000 or more per molecule. In preparing high molecular weight polymers, it is usually desirable that n be about 2. In the preferred embodiment of the invention, n varies from 2 to about 6.

The preparation of the cyclic nitrile compounds useful in the invention forms no part of the invention, and one desiring to explore their preparation may refer to the above-mentioned Patents and U.S. Pat. No. 3,480,595; 3,507,900; 3,609,163; 3,652,507; and 3,658,805, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile sulfite); 1,20-eicosane di(nitrile oxalate); 1,40-tetracontane di(nitrile carbonate); 5-ethyl-1,16-hexadecane di(nitrile carbonate); 1,3,5-pentane tri-(nitrile sulfite); 1,4,6,10-decane tetra(nitrile carbonate); 6-methyl-1,5,8-octane tri(nitrile oxalate); 1,4-cyclohexane di(nitrile carbonate); 2-ethyl-1,3,5-cyclohexane tri (nitrile carbonate); etc.

2. Unsaturated aliphatic and cycloaliphatic compounds such as 1,2-ethane-di(nitrile carbonate); 1,4-butene-2-di(nitrile sulfite); 1,6,9-nonene-2-tri(nitrile oxalate); 3-propyl-1,5,7-heptene-2-tri(nitrile carbonate); 1,4-butyne-2-di(nitrile carbonate); 1,6-hexyne-2-di(nitrile carbonate); 1,4-cyclo-hexene-2-di(nitrile carbonate); etc.

3. Aromatic compounds such as benzene 1,3-di(nitrile carbonate); benzene-1,4-di(nitrile carbonate); and 1,3-diethylbenzene-2,4-di(nitrile oxalate); methylbenzene-di(nitrile carbonate); 1-benzylbenzene-2,4-di(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o'-di(nitrile oxalate); stilbene-p,p'-di(nitrile carbonate); and stilbene-o,o'-di(nitrile sulfite).

Although cyclic nitrile sulfites and cyclic nitrile oxalates function as well as, and sometimes better than, cyclic nitrile carbonates, they are not as suitable as cyclic nitrile carbonates since the sulfites produce sulfur dioxide, an abnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms, such as 1,2-ethane di(nitrile carbonate); 1,4-butane di(nitrile carbonate); and 1,4,8-octane tri(nitrile carbonate).

THE NUCLEOPHILIC COMPOUNDS

Suitable organic nucleophilic compounds include compounds having the active hydrogen present in —OH, —NH—, —NH$_2$, —SH, —SO$_2$NH$_2$, —SO$_2$OH, —COOH, —CSNH$_2$, and —CONHR groups. The organic nucleophilic compounds preferred for use in the invention include aliphatic and aromatic polyols, polyamines, and polythiols, and polymers such as polyester polyols, polyamines or polythiols, polyether polyols, polyamines or polythiols, and polylactones and similar compounds having from 2 to 6 or more, but preferably 3 or more, —OH, —NH—, NH$_2$, or —SH groups or mixtures of these per molecule and having 2 to about 100,000 carbon atoms with hydroxyl numbers ranging from 12 to 1,100 or more. Mixtures of two or more of these compounds can also be employed.

The aliphatic and aromatic polyols, polyamines, and polythiols include, for example, ethylene glycol; diethylene glycol; thiodiethylene glycol; propylene glycol; 1,3-butylene glycol; 1,6-hexanediol; butanediol; butynediol; amylene glycols; 2-methyl-pentanediol-2,4; 1,7-heptanediol; glycerine, neopentyl glycol; trimethylol propane; pentaerythritol; cyclohexane dimethanol; sorbitol; mannitol; glactitol; talitol; xylitol; 1,2,5,6-tetrahydroxyhexane; styrene glycol; bis(hydroxyethyl)diphenyldimethylmethane; silanediols, e.g., triphenyl silane; 1,4-dihydroxybenzene; etc., and the corresponding amine- and thiol-containing compounds.

The polyhydroxyl-, amine- or thiol-containing polymeric compounds useful in this invention include, for instance, polyhydric polyalkylene ethers, polyhydroxyl polyesters, and hydroxyl group-containing, preferably hydroxyl-group terminated, polymers and the corresponding amine and thiol-containing polymers. The polyhydric, polyamine or polythiol polyalkylene ethers may have a molecular weight greater than about 350 and a hydroxyl number of from about 10 to 600 and may be derived, for example, by the polymerization of alkylene oxides such as ethylene oxide, propylene oxide, butylene oxide, and the like. Polyhydric polyalkylene ethers may also be prepared by the polymerization of the cyclic ethers such as, for example, dioxane, tetrahydrofuran, and the like and by the condensation of an alkylene oxide with a glycol, such as ethylene glycol, propylene glycol, butylene glycol, and the like.

The hydroxy-, amine-, and thiol-containing polyesters may be obtained by the reaction of aliphatic or aromatic dicarboxylic acids with aliphatic or aromatic polyhydric, polyamine or polythiol alcohols in the manner well known to the art in proportions that result in esters having at least two reactive hydroxy, amino or mercaptan groups. Any polyols, polyamine or polythiol alcohols may be used to form the esters, aminoesters, and thio-esters and illustrative of such alcohols, amines, and thiols are those listed above in the discussion of suitable alcohols, amines, and thiols as the active hydrogen-containing reactant. Included within the suitable esters, aminoesters, and hydroxyl-containing thioesters are the mono and diglycerides of castor oil, tall oil, soya oil, linseed oil, etc., and the corresponding amine and thio-esters. The latter esters, aminoesters, and thio-esters are usually prepolymers prepared by the reaction of the fatty glyceride with low molecular weight polhydric, polyamine or polythiol alcohols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate and the corresponding amine and thiol prepolymers. Other suitable polymers such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as α-olefins of up to 12 carbon atoms such as ethylene, propylene, butene, etc.; styrene acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides. A particulary suitable hydroxyl-containing compound is styrene-vinyl alcohol copolymer, made by copolymerizing styrene and vinyl acetate and partially or fully hydrolyzing the acetate groups to alcohol groups.

When compositions having a considerable storage life are to be prepared, it is preferable that the functional groups on the nucleophilic compounds be either hydroxyl or thiol groups since amine groups are too reactive with cyclic nitrile groups to form a stable reactable composition of any practical significance.

The preferred compounds are the polyols, particularly the polyester and polyether polyols.

The functionality of the cyclic nitrile component and the organic nucleophilic component is at least 2. It is often desirable that the functionality of one or both of the reacting components be higher than 2. In general, it is preferred that the cyclic nitrile compounds used have a functionality of two and the functionality of the organic polyls, polyamines or polythiols be varied since it is much more economical to prepare polyfunctional hydroxyl amine, and thiol compounds than polyfunctional cyclic nitrile compounds.

The ratio of cyclic nitrile compound to organic polyol or polythiol compounds may vary depending upon the desired properties of the product and the functionality of the reacting materials. In general, it is desired to use amounts of cyclic nitrile compound and organic polyhydroxyl, amine and/or polythiol compounds that will provide a ratio of cyclic nitrile functional group to total polyhydroxyl, polyamine, and polythiol groups of about 0.7 to 10:1 and preferably about 0.7 to 1.4:1. The same ratios apply when using a prepolymer and additional monomer in the composition, i.e., the ratio of the component having the reactive cyclic nitrile groups to the component having the reactive hydrogen-containing groups is desirably such that there are 0.7 to 10 and preferably 0.7 to 1.4 cyclic nitrile functional groups per each reactive hydrogen-containing group in the composition.

THE CATALYST

The catalyst used in the reaction mixtures of the invention is comprised of an anhydrous halide of a metal of Group IIb of the Periodic Table of the Elements which includes zinc, cadmium and mercury. The term halide includes fluorides, chlorides, bromides, and iodides. Suitable catalysts include $ZnCl_2$, $ZnF_2$, $ZnBr_2$, $ZnI_2$, $CdCl_2$, $CdBr_2$, $HgCl$, $HgCl_2$, $HgBr_2$, etc. The preferred catalysts are the chlorides and bromides of these metals and $ZnCl_2$ and $ZnBr_2$ are the most preferred catalysts.

The amount of catalyst employed will vary depending upon the type of product, the reaction temperature, and the desired properties of the product. By way of example, the catalyst is desirably present in an amount of from about 0.01% to about 5%, preferably from about 0.1% to about 2%, by weight, based on the total weight of the reactive components in the reaction mixture. Amounts above or below these ranges may sometimes be effectively used but it is preferred that the catalyst concentration be within these limits.

The shelf-stable compositions are substantially anhydrous and may be either in the dry powdered state or the liquid state. Dry powdered reaction compositions are preferably prepared from solid components although one or more of the components may be liquid provided that there is a sufficient amount of dry components to completely absorb the liquid components so that a free flowing powder can be prepared.

The particle size of the coating powder compositions of the invention is such that most of the composition has a particle size range between 10 to 500 microns and it is preferred that most of the compositions be in the particle size range of about 50 to 250 microns. The various components of the coating powder composition may be ground separately or combined and ground together. Since heat initiates reaction between the cyclic nitrile groups and the polyol, polyamine, or polythiol groups, it is preferred to grind the ingredients of the powder formulation separately or under conditions such that excess heat is not produced. One particularly suitable method is freeze grinding in which the material is frozen before grinding to minimize the temperature rise of the mixture. There are many well known suitable methods for grinding coating materials to a size suitable for powder coating techniques and the method of size reduction of the coating powders used in this invention forms no part of the invention.

The dry powdered reaction compositions of the invention are particularly suitable for use in powder coating processes such as electrostatic powder spray or fluid bed systems. Additional details of these techniques are described in copending commonly owned U.S. patent application Ser. No. 424,487, filed on Dec. 13, 1973, in the names of D. H. Russell and K. C. Frisch, incorporated herein by reference.

When the storage-stable compositions of the invention are intended for application by conventional coating methods such as spraying or brushing techniques, they may be made from solid or liquid reactants and diluted, as desired, with volatile organic solvents. Suitable solvents commonly used in coating film-forming or adhesive technology include anhydrous ethyl acetate, butyl acetate, methyl ethyl ketone, methyl isobutyl ketone, xylene, toluene, benzene, cellulose acetate (2-ethoxyethyl acetate), and the like.

When the nucleophilic compound contains active hydrogens in a hydroxyl group, polyurethane products are prepared; while if the group containing the active hydrogens is an amino group, polyurea products are obtained. Reaction of the cyclic nitrile adduct reactant with both a hydroxyl group-containing compound and an amino group-containing compound, either simultaneously or sequentially, provides urea-urethane polymeric products. And when the nucleophilic compound contains active hydrogens in a mercapto group, then polythiourethane products are obtained.

As indicated above, products made by means of the instantly disclosed catalysts have exceptionally high molecular weights, for example, having weight average molecular weights of about 150,000 or higher. Moreover, where these poly-condensation products are prepared from difunctional cyclic nitrile compounds and difunctional nucleophilic compounds, they are soluble in a variety of organic solvents, such as chloroform, tetrahydrofuran, dimethylformamide, dimethylsulfoxide, and aromatic hydrocarbon solvents. This unique solubility characteristic of the high molecular weight polymers is apparently a result of a substantially linear (i.e., non-crosslinked) configuration of the polymer molecules, which configuration is further evidenced by the thermoplastic character of the products. Especially preferred polycondensation products of the present invention are those having weight average molecular weights of at least about, say, 200,000 or even 300,000; and further unique are those products of greater than about 500,000 molecular weight. Preferably, these are obtained from difunctional reactants and are soluble in, for example, chloroform, although it is recognized that even the difunctional reactants-derived products of the present invention become less soluble as their molecular weights increase.

It is possible in accordance with the present invention to produce cellular or nonporous plastics, including films, coatings, adhesive layers, impregnated compositions, castings, moldings, and the like. However, in the production of polyurethane foams by the process of the invention it is not necessary, as it is in conventional prior art processes, to employ an extraneous foaming or blowing agent since the cyclic nitrile compound reactants contain their own internal or "built in" blowing agent namely, the gas they evolve during reaction with the nucleophilic compounds. Conventional foaming agents, however, may be employed if desired, among which may be listed — low boiling hydrocarbons such as pentane, hexane, cyclohexane, and the like, as well as agents which will decompose to evolve an inert gas as, for instance, ammonium carbonate, sodium bicarbonate, N,N'-dimethyl-N,N'-dinitrosoterephthalamide, para, para'-oxybis(benzenesulfonic acid), azodicarbonamide, benzene sulfonyl hydrazide, azobisisobutyronitrile, paratertiary butyl benzoylazide, and the like.

Formulation of polyurethane foams can follow the well-established practice of the art with the notable exception that the conditions of the reaction between the cyclic nitrile compound and nucleophilic compound be controlled to effect the reaction at a rate slow enough to preclude escape of the evolved gas before gelation to the extent sufficient to entrap the evolved gas and form a cellular, elastomeric polyurethane has occurred.

When preparing foamed products from the compositions of the present invention, it is generally preferred to employ at least a trifunctional reactant, which can be either the cyclic nitrile compound, the nucleophilic compound or both. Thus, for example, excellent polyurethane foams can be prepared by condensing a difunctional cyclic nitrile compound with a triol to yield a crosslinked product.

If desired, surface active agents might be in concentrations of about 0.1% to 5% by weight of the reactants to stabilize the foam. Generally used are silicone emulsifiers and non-ionic surface active agents such as ethylene oxide condensates of vegetable oils, alcohols, and organic acids.

In accordance with the usual practice, inert, inorganic or organic fillers or both, and other additives may be included in the reaction mixture. Suitable inert, inorganic materials include, for example, clay, talc, silica, carbon black, asbestos, glass, mica, calcium carbonate, antimony oxide, and the like. Organic fillers include, for instance, the various polymers, copolymers, and terpolymers of vinyl chloride, vinyl acetate, acrylonitrile, acrylamide, styrene, ethylene, propylene, butadiene, divinylbenzene, etc. Other additives which may be added include plasticizers such as dioctyl phthalate, di(2-ethylhexyl) adipate, etc., extenders, softeners, coloring agents, and emulsifiers.

The polymeric products produced by the invention have many uses. For example, they are excellent materials for use in the preparation of castings, molds, sealants, potting compounds, insecticides, adhesives, coatings, films, foams, etc.

To produce coatings, films, foams, etc. from the storage-stable compositions of the invention, the reaction composition is heated to a temperature of about 140° to 300°C and preferably 160° to 250°C until the desired cure is attained. The cure time will vary depending upon the catalyst used, the cure temperature, the equivalent ratio of the reactants, and the physical properties sought. In general, times ranging from 5 minutes to 1 hour are satisfactory.

The following working examples of the present invention illustrates a specific embodiment. Unless otherwise indicated, parts and percentages are on a weight basis.

EXAMPLE I

To a suitable container are added 100 parts of 2-ethoxy ethyl acetate (solvent); 100 parts of adipodi(nitrile carbonate) (ADNC) and a tetrol made from propylene glycol and pentaerythritol having an equivalent weight of 101 and a hydroxyl number of 558 (sold by Wyandotte Chemical Company under the trademark Pep 450) in a proportion such that the ratio of cyclic nitrile groups to hydroxyl groups is 1:1, and 1 part of anhydrous zinc chloride (catalyst). This mixture can be stored for at least four months at 50°C without any significant change in properties. After several months storage the mixture can be heated at 70°C with stirring for 30 minutes, cooled to room temperature and then applied to a degreased mild steel panel at a thickness of about 1.3 mils. The film can then be cured for 30 minutes at 170°C. The cured film when tested will have a pencil hardness of about 5H, a Gardner Impact strength of about 160 inch-pounds (direct and reverse) and will pass a 174 inch mandrel bend test.

EXAMPLE II

A composition in dry powdered form can be prepared in accordance with the procedure of Example I except that the solvent is omitted. The dry mixture can be blended under conditions such that very little heat is generated and no reaction occurs. The resulting dry powdered composition can be stored indefinitely at 50°C. When it is desired to form a product from the mixture it can be placed in a mold and heated at 175°C for about 15 minutes. A solid polyurethane product having good physical properties will be obtained.

EXAMPLE III

A dry powdered composition is prepared in accordance with the procedure of Example II except that benzene-1,4-di(nitrile sulfite) is substituted for the adipodi(nitrile carbonate), 1,2,5,6-tetramercaptohexane is substituted for the Pep 450, and anhydrous cadmium chloride ($CdCl_2$) is substituted for the anhydrous zinc chloride. The dry powdered composition can be stored indefinitely at 50°C without any substantial change in its properties.

When it is desired to form a product from the composition it is placed in a mold and heated at a temperature of about 170°C for about 20 minutes. A solid polythiourethane having good physical properties will be obtained.

The above Examples illustrate the utility of the catalysts of the invention in the preparation of urethane-type polymers.

Although the invention has been described with particular reference to specific Examples, it is contemplated that modifications of these may be employed and, accordingly, the breadth of the invention is to be limited solely by the scope of the appended claims.

We claim:

1. A storage-stable urethane type polymer-forming composition in powdered form comprised of
   A. A cyclic nitrile compound having the structural formula wherein X is

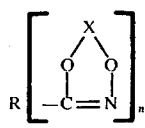

wherein X is

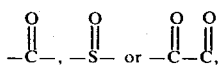

R is an organic radical free of reactive hydrogens as determined by the Zerewitinoff Test and $n$ is at least 2.

B. A nucleophilic organic compound having at least 2 reactive hydrogen-containing radicals selected from the group consisting of primary amino radicals, secondary amino radicals, hydroxy radicals, and mercapto radicals, and, C. About 0.1 to 5% based on the total weight of A. and B. of a halide of a metal of Group IIb of the Periodic Table, the cyclic nitrile compound and the nucleophilic compound being present in amounts such that the ratio of cyclic nitrile groups to reactive hydrogen containing groups is about 0.7 to 10:1.

2. The composition of claim 1 wherein C. is present in an amount of about 0.1 to 2% based on the total weight of A. and B.

3. The composition of claim 1 wherein said halide is a chloride or a bromide.

4. The composition of claim 3 wherein said metal halide is zinc chloride.

5. The composition of claim 1 wherein said nucleophilic organic compound is selected from the class consisting of organic polyols, organic polythiols, and mixtures of these.

6. The composition of claim 1 in powder form having a particle size of about 10 to 500 microns.

7. The composition of claim 6 having a particle size of about 50 to 250 microns.

8. The composition of claim 1 wherein the ratio of cyclic nitrile groups to reactive hydrogen-containing groups is about 0.7 to 1.4:1.

9. The composition of claim 1 wherein X is

R contains 2 to 50 carbon atoms, and n is 2 to 6.

10. The composition of claim 9 wherein A. is adipo-di(nitrile carbonate).

11. The composition of claim 10 wherein C. is zinc chloride or zinc bromide.

12. The composition of claim 1 wherein B. is a polyester polyol or a polyether polyol.

13. The composition of claim 12 wherein A. is adipo-di(nitrile carbonate).

14. The composition of claim 13 wherein C. is zinc chloride.

* * * * *